US010744577B2

(12) United States Patent
Crespin et al.

(10) Patent No.: US 10,744,577 B2
(45) Date of Patent: Aug. 18, 2020

(54) CUTTING INSERT POSITIONING CARTRIDGE AND SYSTEM FOR A MACHINING TOOL AND A MACHINING TOOL COMPRISING SUCH A POSITIONING SYSTEM

(71) Applicant: SANDVIK INTELECTUAL PROPERTY AB, Sandviken (SE)

(72) Inventors: Frank Crespin, Parcay-Meslay (FR); Yannick Sarton, Luynes (FR)

(73) Assignee: SANDVIK INTELLECTUAL PROERTY AB, Sandviken (SE)

( * ) Notice: Subject to any disclaimer, the term of this patent is extended or adjusted under 35 U.S.C. 154(b) by 0 days.

(21) Appl. No.: 15/518,528

(22) PCT Filed: Sep. 23, 2015

(86) PCT No.: PCT/EP2015/071830
§ 371 (c)(1),
(2) Date: Apr. 12, 2017

(87) PCT Pub. No.: WO2016/058798
PCT Pub. Date: Apr. 21, 2016

(65) Prior Publication Data
US 2017/0232533 A1 Aug. 17, 2017

(30) Foreign Application Priority Data

Oct. 13, 2014 (EP) .................................... 14188658

(51) Int. Cl.
*B23C 5/24* (2006.01)
*B23C 5/06* (2006.01)

(52) U.S. Cl.
CPC .............. *B23C 5/241* (2013.01); *B23C 5/06* (2013.01); *B23C 5/2462* (2013.01);
(Continued)

(58) Field of Classification Search
CPC . B23C 5/241; B23C 5/2462; B23C 2210/168; B23C 2245/04; B23C 5/06
See application file for complete search history.

(56) References Cited

U.S. PATENT DOCUMENTS 3,839,772 A 10/1974 Shimomura et al.
5,209,610 A * 5/1993 Arai ...................... B23C 5/241
407/36
(Continued)

FOREIGN PATENT DOCUMENTS

DE 2044000 A1 3/1971
DE 2806079 B1 * 3/1979 ........... B23C 5/2444
(Continued)

OTHER PUBLICATIONS

English translation of DE-2806079-B1, Mar. 1979 (Year: 1979).*

*Primary Examiner* — Alan Snyder
(74) *Attorney, Agent, or Firm* — Corinne R. Gorski

(57) ABSTRACT

A cartridge for positioning a cutting insert onto a machining tool has a central longitudinal axis, along which the cutting insert is configured to be positioned and an end wall for supporting the cartridge. The end wall defines a first surface extending beyond the end wall and transversally to the central longitudinal axis. The cartridge includes a rear wall for supporting the cartridge against the machining tool and defining a second surface extending beyond the rear wall and a front clamping wall having a clamping hole. The clamping hole extends along a clamping direction and is configured to receive a clamping screw for clamping the cartridge onto the machining tool, wherein the clamping direction is arranged to intersect the first and second surfaces.

10 Claims, 3 Drawing Sheets

(52) U.S. Cl.
CPC .. *B23C 2210/168* (2013.01); *B23C 2210/287* (2013.01); *B23C 2210/325* (2013.01); *B23C 2245/04* (2013.01)

(56) References Cited

U.S. PATENT DOCUMENTS 5,868,529 A * 2/1999 Rothballer ............ B23C 5/2444
407/36
8,584,556 B2 * 11/2013 Heinloth ................. B23C 3/06
82/106
8,814,478 B2 * 8/2014 Baer ........................ B23C 5/08
407/36

FOREIGN PATENT DOCUMENTS

| DE | 3042051 A1 | 7/1982 | | |
|---|---|---|---|---|
| DE | 3918034 A1 | 12/1990 | | |
| JP | S63086920 U | 6/1988 | | |
| WO | 2008116762 A1 | 10/2008 | | |
| WO | WO 2009048098 A1 * | 4/2009 | ............... | B23C 5/06 |
| WO | WO-2009048098 A1 * | 4/2009 | ............... | B23C 5/06 |

* cited by examiner

CUTTING INSERT POSITIONING CARTRIDGE AND SYSTEM FOR A MACHINING TOOL AND A MACHINING TOOL COMPRISING SUCH A POSITIONING SYSTEM

RELATED APPLICATION DATA

This application is a § 371 National Stage Application of PCT International Application No. PCT/EP2015/071830 filed Sep. 23, 2015 claiming priority of EP Application No. 14188658.0, filed Oct. 13, 2014.

FIELD OF THE INVENTION

The invention relates to cartridge for positioning a cutting insert onto a machining tool. The invention further relates to a cutting insert positioning system including such a cartridge and a machining tool including such a cutting insert positioning system. The invention finally relates to a method for positioning a cutting insert onto a machining tool.

BACKGROUND OF THE INVENTION

It is known in the field of machining to use machining tools having a least a cartridge on which a cutting insert is mounted so that the position of the cutting insert can be adjusted independently relative to the other cutting inserts of the machining tool. This allows the machining tool to have cutting inserts able to machine passes having different depths so that one same machining tool can for example perform rough and finishing operations.

For adjusting the position of the cartridge relative to the machining tool, it is known to couple the cartridge with a wedge having, as the cartridge, an oblique surface so that when the wedge is displaced in a first direction, the cartridge and thus the cutting insert mounted onto which is displaced in a second direction perpendicular to the first direction.

Example of such an assembly gathering a cartridge and a wedge mounted onto a machining tool is disclosed in U.S. Pat. No. 3,839,772. The cutting tool disclosed in this latter document comprises a recess formed in its periphery to receive the wedge at the bottom of the recess. The cartridge is disposed so as to contact the wedge and the lateral walls of the recess. A positioning screw having differential pitches is both screwed within a threaded hole of the cutting tool and a threaded hole of the wedge. Screwing the positioning screw results in displacing the wedge in a direction along which the positioning screw extends. Both the wedge and the cartridge have an oblique contact surface so that when the wedge is displaced along the extending direction of the positioning screw, the cartridge is displaced along a direction perpendicular to the extending direction. Then, so as to set the cutting insert position, the cutting tool comprises a screw allowing, when screwed in a clamped position, the cartridge to be pressed into contact with the lateral wall of the recess.

However, an important drawback of this cutting tool is that, when adjusting the cutting insert position, if the cartridge is displaced beyond a predetermined position, the cartridge cannot be displaced in the opposite direction to set the cartridge at the predetermined position. Indeed, the clamping screw has to be totally unscrewed so as to release the cartridge from clamping and the positioning screw has to be unscrewed so as to move back the wedge in an initial position. Then, operation of setting the cartridge can be performed again. Therefore, the setting operation of this cutting tool is difficult and leads the operator to waste a lot of time. This is particularly noticeable when the cutting insert comprises several cartridges.

SUMMARY OF THE INVENTION

The aim of the present invention is to provide a technical solution enabling simple adjusting of the position of the cutting insert when mounted onto the machining tool.

This object is achieved with a cartridge for positioning a cutting insert onto a machining tool, said cartridge having a central longitudinal axis, along which the cutting insert being configured to be positioned, and comprising:
  an end wall for supporting the cartridge, said end wall defining a first surface extending beyond the end wall and transversally to the central longitudinal axis,
  a rear wall for supporting the cartridge against the machining tool and defining a second surface extending beyond the rear wall,
  a front clamping wall having a clamping hole, said clamping hole extending along a clamping direction and being configured to receive a clamping screw for clamping the cartridge onto the machining tool,
wherein the clamping direction is arranged to intersect the first and second surfaces.

According to another embodiment, the clamping direction is arranged to intersect the rear wall.

According to another embodiment, the rear wall comprises a first and a second rear walls for supporting the cartridge against the machining tool, wherein the clamping direction intersects the first and/or the second rear walls.

According to another embodiment, the second surface comprises a first and a second surface portions defined by the first and the second rear walls respectively, wherein the clamping direction intersects the first rear wall and the second surface portion.

According to another embodiment, the end wall (23) is oblique.

According to another embodiment, the cartridge comprises a cutting insert hole extending along a cutting insert axis for clamping a cutting insert to the cartridge, the cutting insert axis being substantially parallel to the central longitudinal axis.

According to another embodiment, the cartridge comprises a cutting insert hole extending along a cutting insert axis for clamping a cutting insert to the cartridge, the cutting insert axis being substantially perpendicular to the central longitudinal axis.

According to another embodiment, the cartridge comprises an abutting portion protruding from the end wall at the front and/or rear wall for forming at least one abutment between the front wall and the rear wall.

Another object of the invention is to provide a cutting insert positioning system comprising:
  a cartridge as described above,
  a cutting insert configured to be clamped onto the cartridge,
  a wedge for displacing the cartridge along the central longitudinal axis, the wedge contacting the cartridge at the end wall.

According to another embodiment, the cutting insert positioning system further comprises:
  a clamping screw disposed within the clamping hole of the cartridge for clamping the cartridge to the machining tool, a positioning screw having:
   a first threaded portion arranged for cooperating with a positioning hole formed within the wedge, and
   a second threaded portion arranged for cooperating with a threaded hole of the machining tool,
   wherein the wall of the wedge supporting the cartridge is oblique in a complementary manner to the end wall.

Another object of the invention is to provide a machining tool comprising:
   a recess formed at the periphery of the machining tool,
   a cutting insert positioning system as described above being disposed within the recess.

According to another embodiment, the machining tool further comprises at least a fixed cutting insert clamped onto the machining tool.

According to another embodiment, the machining tool is a milling tool comprising a plurality of cutting inserts each clamped onto a cutting insert positioning system as described above and a plurality of fixed cutting inserts clamped onto the milling tool.

Another object of the invention is to provide a method for positioning a cutting insert onto a machining tool as described above, comprising the steps of:
   disposing the wedge within a recess of the machining tool so that the threaded hole formed within the machining tool is aligned with the positioning hole formed within the wedge,
   screwing the positioning screw into the wedge so that the first and the second threaded portions cooperate respectively with the positioning hole of the wedge and the threaded hole of the machining tool,
   disposing the cartridge within the recess so that the wedge contacts the end wall of the cartridge,
   screwing the clamping screw into the clamping hole of the cartridge at a predetermined torque,
   adjusting the position of the cartridge by screwing the positioning screw in opposites directions along its central longitudinal axis so as to position the cutting insert at a predetermined position.

Further features and advantages of the invention will appear from the following description of embodiments of the invention, given as non-limiting examples, with reference to the accompanying drawings listed hereunder.

DETAILED DESCRIPTION OF THE INVENTION

Figure 1:
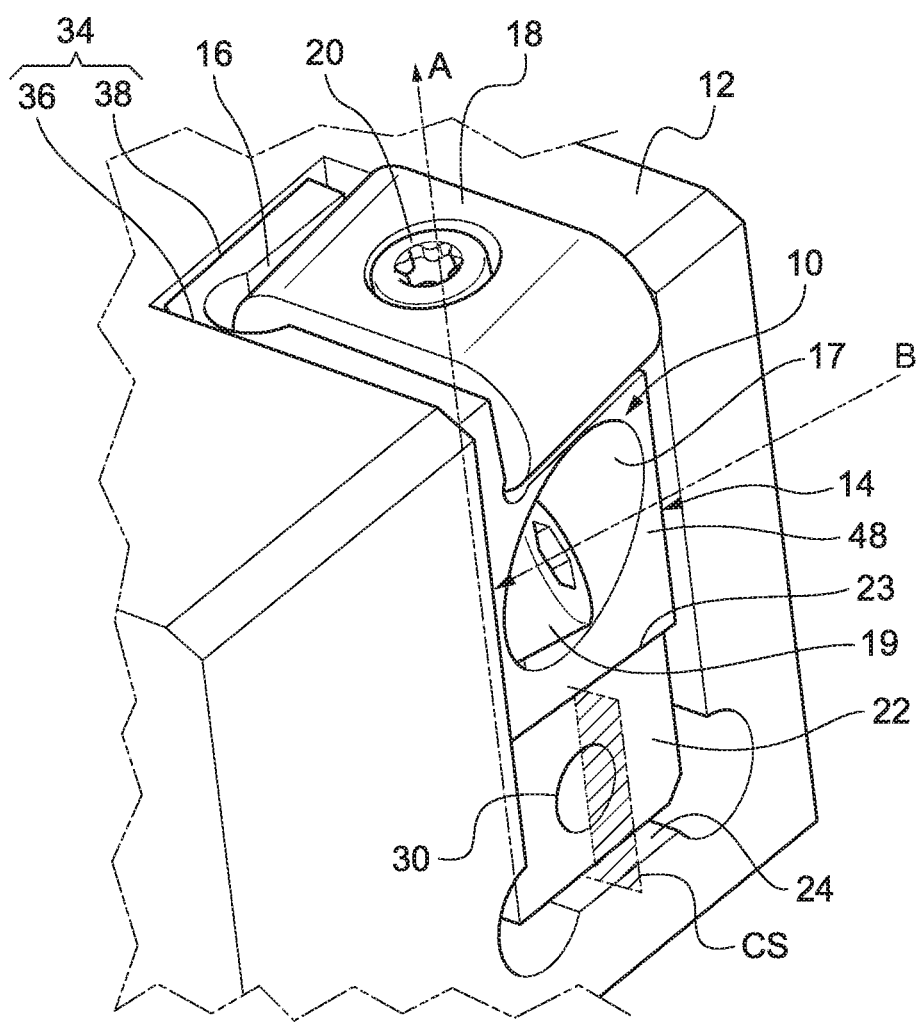
FIG. 1 shows schematically an assembly comprising a cartridge on which a cutting insert is clamped and a wedge both mounted within a recess of a machining tool.

According to the invention, a cartridge is provided for positioning a cutting insert onto a machining tool at a predetermined position. The predetermined position corresponds to the position of the cutting insert in which machining operation can be performed. The cartridge is arranged to be inserted within a recess formed at the periphery of the machining tool. The cartridge extends along a central longitudinal axis along which the cutting insert is to be positioned. In other words, for positioning the cutting insert relative to the machining tool, the cartridge is arranged to be displaced along the central longitudinal axis. Particularly, the cartridge is mounted onto a positioning device able to displace the cartridge along the central longitudinal axis.

Further, the cartridge comprises an end wall and a rear wall which are reference surfaces relative to which the positioning of the cutting insert can be performed. In other words, the position of the cartridge and thus the position of the cutting insert mounted onto which is defined when both of the rear wall and the end wall are abutting with an external wall when the cartridge is disposed within the recess. Particularly, the end wall is intended for supporting the cartridge transversally to the central longitudinal axis of the cartridge. The end wall is intended to be in contact with the positioning device so that the positioning device can transmit forces to the cartridge. Further, the end wall defines a first surface extending beyond the end wall and transversally to the central longitudinal axis, the first surface being a geometrical surface. In other words, the end wall is included within the first surface so that the end wall is only a portion of the first surface. The first surface is thus an extension of the end wall. The rear wall is intended for supporting the cartridge against the machining tool. The rear wall defines a second surface extending beyond the rear wall, the second surface being also a geometrical surface. Similarly to the end wall, the rear wall is included within the second surface so that the rear wall is only a portion of the second surface. The second surface is thus an extension of the rear wall. The rear wall may be formed for example by a unique circular-shaped wall, by two or more flat walls or any wall with a shape allowing the rear wall to support the cartridge against the machining tool.

The cartridge further comprises a front wall having a clamping hole for receiving a clamping screw for clamping the cartridge within the recess of the machining tool. The clamping hole extends through the cartridge and along a clamping direction which is arranged to intersect the first and the second surfaces. In this way, when the clamping screw is screwed into the machining tool through the hole of the cartridge, the cartridge is pressed against the first and the second surface. Therefore, the clamping direction allows the cartridge to be pressed against the rear wall and against the end wall, i.e. the wall supporting the cartridge along the principal extending direction along which the cutting insert is to be positioned.

As a result, when the cartridge is clamped to the machining tool, the end wall is always pressed into contact with the positioning device so that the cartridge is able to follow the displacement of the positioning device in both directions along the central longitudinal axis. In this way, when the cartridge is displaced beyond a predetermined position along the central longitudinal axis, the cartridge can be displaced in the opposite direction so as to set the cartridge at the predetermined position. Therefore, contrary to the known cartridge described above, the clamping screw does not have to be unscrewed to displace the cartridge in the opposite direction.

For improving the contact between the rear wall and the machining tool, the clamping direction may be further arranged to intersect the rear wall, in addition to the first and second surfaces. In this way, the force induced by clamping the cartridge to the machining tool is increased onto the rear wall.

Further, the rear wall may comprise a first and a second rear walls for supporting the cartridge against the machining tool. In this case, the second surface comprises a first surface portion and a second surface portion, the first and the second rear walls defining the first and second surface portions. In other words, the first rear wall is part of the first surface portion and the second rear wall is part of the second surface portion. For improving the repartition of the force exerted by the rear wall, the clamping direction may be arranged to intersect both the first and the second rear walls, i.e. at the intersection of the first and the second rear wall. For a relevant ratio between improving repartition of the force exerted by the rear wall and easier manufacturing of the cartridge, it is preferable that the clamping direction is arranged to intersect the first rear wall and the second surface portion, in addition to the first surface.

DETAILED DESCRIPTION OF THE DRAWINGS

FIG. 1 shows a cartridge 10 for positioning a cutting insert 18 onto a machining tool 12. The cartridge 10 is received within a recess 14 of the machining tool 12.

The cartridge 10 extends along a central longitudinal axis A and comprises at its top end a slot 16 for receiving a cutting insert 18 clamped to the cartridge 10 with a cutting insert screw 20. The slot 16 is arranged so that the extending axis of the cutting insert screw 20 extends substantially parallel to the central longitudinal axis A. The central longitudinal axis A of the cartridge 10 corresponds to the axis along which the cutting insert 18 is to be positioned. In other words, the central longitudinal axis A is the axis along which the cartridge 10 is displaced for positioning the cutting insert 18. Further, the cartridge 10 comprises a front wall 48 having a clamping hole 17 extending along a clamping direction B for receiving a clamping screw 19 so that the cartridge 10 can be clamped to the machining tool 12. The clamping hole 17 is thus a through hole.

Figure 2:
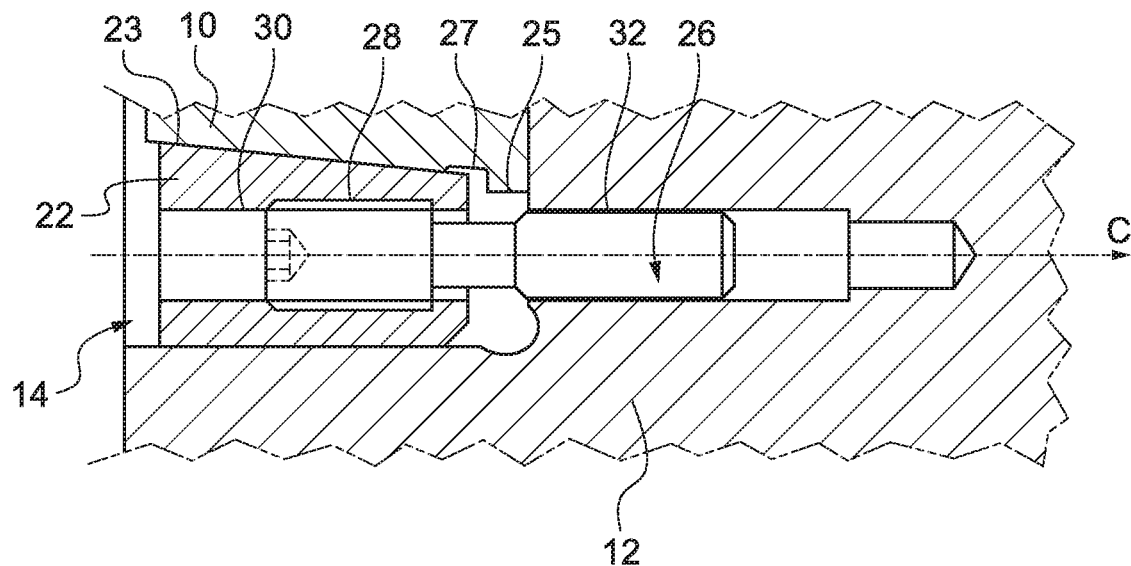
FIG. 2 shows schematically a partial cross-sectional view of the assembly according to FIG. 1.

Further, a wedge 22 is disposed within the recess 14 between a bottom wall 24 of the recess 14 and an end wall 23 of the cartridge 10. The wedge 22 is intended for displacing the cartridge 10 along the central longitudinal axis A. FIG. 2 shows a cross sectional view of the wedge 22, the machining tool 12 and the cartridge 10 according to a cross section CS for improving the comprehension of the wedge functioning. Particularly, a positioning screw 26 is screwed through both the wedge 22 and the machining tool 12 along a positioning axis C. The positioning screw 26 comprises a first threaded portion 28 screwed with a positioning hole 30 formed through the wedge 22 and a second threaded portion 32 screwed within the machining tool 12. Since the wedge 22 is in contact with the cartridge 10 on one side and with the machining tool 12 on another side, the wedge 22 can thus be displaced along the positioning axis C by screwing the positioning screw 26. Further, the end wall 23 of the cartridge 10 and the wall of the wedge 22 contacting the cartridge 10 are both oblique in a complementary manner so that displacing the wedge 22 along the positioning axis C results in displacing the cartridge 10 in a direction perpendicular to the positioning axis C. A complementary manner means that the end wall 23 of the cartridge 10 and the wall of the wedge 22 contacting the cartridge 10 are inversely oblique so that a displacement of the end wall 23 in a first direction results in displacing the wedge 22 in a second direction perpendicular the first direction. In this case, the positioning axis C is perpendicular to the central longitudinal axis A of the cartridge so that displacing the wedge 22 along the positioning axis C results in displacing the cartridge 10 along the central longitudinal axis A.

For improving the precision of the positioning of the cutting insert 18, the first threaded portion 28 is provided with a pitch higher than the pitch of the second threaded portion 32. Indeed, a first threaded portion 28 with a higher pitch than the pitch of the second threaded portion 32 results, for one revolution of the positioning screw 26, in displacing the wedge 22 along the positioning axis C on a distance equal to the difference between the pitches of the first threaded portion 28 and the second threaded portion 32. Further, for a same obliqueness and for one revolution of the positioning screw 26, displacing the wedge 22 on a lower distance results in displacing the cartridge along the central longitudinal axis A on a lower distance. Therefore, positioning the cutting insert 18 is facilitated. As a result, providing the first threaded portion 28 with a pitch higher than the pitch of the second threaded portion 32 allows a more precise positioning of the cutting insert 18 along the central longitudinal axis A.

The cartridge 10, the wedge and the positioning screw 26 constitute a cutting insert positioning system that is part of the invention.

The cartridge 10 further comprises a rear wall 34 for contacting the wall of the recess 14 for abutting the cartridge 10. The rear wall 34 is formed by a first rear wall 36 and a second wall 38 for supporting the cartridge 10 against the machining tool 12. The angle between the first 36 and the second 38 rear walls may not be a right angle. The first 36 and second 38 rear walls, as the end wall 23, are reference surfaces relative to which the positioning of the cutting insert 18 is performed. In other words, the position of the cartridge 10—and thus the position of the cutting insert 18—is defined when both of the rear wall 34 and the end wall 23 are respectively contacting the wedge 22 and the wall of the recess 14.

Furthermore, the cartridge 10 comprises an abutting portion 25 protruding from the end wall 23 at the rear wall 34. The abutting portion 25 enables the wedge 22 to be stopped when displaced inward the recess 14. For facilitating manufacturing of the abutting portion 25, a groove 27 may be formed in the end wall 23. The cartridge 10 may further comprise, alternatively or in combination with the abutting portion 25, another abutting portion protruding from the end wall 23 at the front wall 48 so that the wedge 22 can come into contact with the other abutting portion when the positioning screw 26 is screwed for displacing the wedge 22 outwardly of the recess 14. In this way, when the cartridge 10 is installed within the recess 14 and contacts the wedge 22, an operator setting the cartridge 10 by screwing the positioning screw 26 cannot accidentally take the wedge 22 out from the recess 14. The setting operation of the cartridge 10 is thus safer and easier for the operator.

Figure 3:
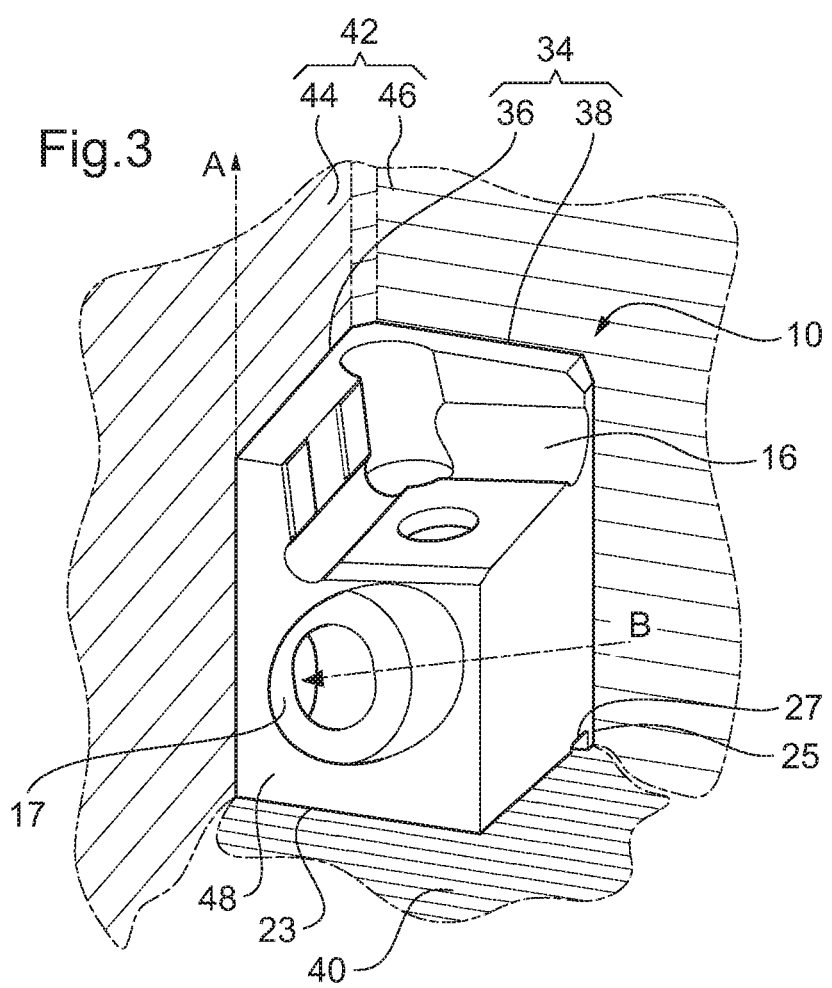
FIG. 3 shows schematically a cartridge according to FIG. 1 isolated from the assembly.

FIG. 3 shows an isolated view of the cartridge 10.

The end wall 23 defines a first surface 40 extending beyond the end wall 23 and transversally to the central longitudinal axis A. Since the end wall 23 is flat, the first surface 40 is a plane including the end wall 23. Further, the rear wall 34 defines a second surface 42 extending beyond the rear wall 34. Similarly to the end wall 23, the second surface 42 consists of at least two planes respectively including the first 36 and the second 38 rear walls since both the first 36 and the second 38 rear walls are flat. These two planes are respectively a first 44 and a second 46 surface portions of the second surface 42. The first 36 and the second 38 rear walls may have any shape allowing the first 36 and the second 38 rear walls to support the cartridge 10 against the machining tool 12 and allowing the cartridge 10 to be displaced along the central longitudinal axis A, the first 44 and the second 46 surface portions being an extension of the first 36 and the second 38 rear walls. For instance, if the first 36 and the second 38 rear walls are circular-shaped and thus form a continuing single circular wall, the first 44 and the second 46 surface portions are also continually circular-shaped. Alternatively, the first 36 and the second 38 rear walls may comprise a plurality of portions inclined relative to each other, these latter portions being for instance circular-shaped or straight.

The clamping direction B along which the cartridge is clamped to the machining tool 12 is arranged to intersect the first surface 40 and at least a portion of the second surface 42. Particularly, the clamping direction B is arranged to intersect the first surface 40, the first rear wall 36 and the second surface portion 46. In other words, the clamping direction B is arranged so that the clamping hole 17 extends through the cartridge 10 from a front clamping wall 48 to the first rear wall 36. In this way, when clamped, the cartridge 10 is pressed into contact with the end wall 23 and both the first 36 and the second 38 rear walls while enabling the cartridge 10 to have a reduced bulkiness and an easier manufacturing than the known devices described above. Alternatively, instead of intersecting the first rear wall 36, the clamping direction B may be arranged so that the clamping hole 17 extends through the cartridge 10 to the second rear wall 38. In this case, the clamping direction B further intersects the first surface 40 and the first surface portion 44. Furthermore, the clamping direction B may be arranged so that the clamping hole 17 extends through the cartridge 10 from another front wall of the cartridge 10 than the front wall 48. In this case, the recess 14 of the machining tool 12 may be arranged so that the other front wall is accessible for an operator for screwing the clamping screw 19. Any arrangement of the clamping direction B is possible since screwing the clamping screw 19 results in pressing the cartridge 10 against both the machining tool 12 and the wedge 22.

Figure 4:
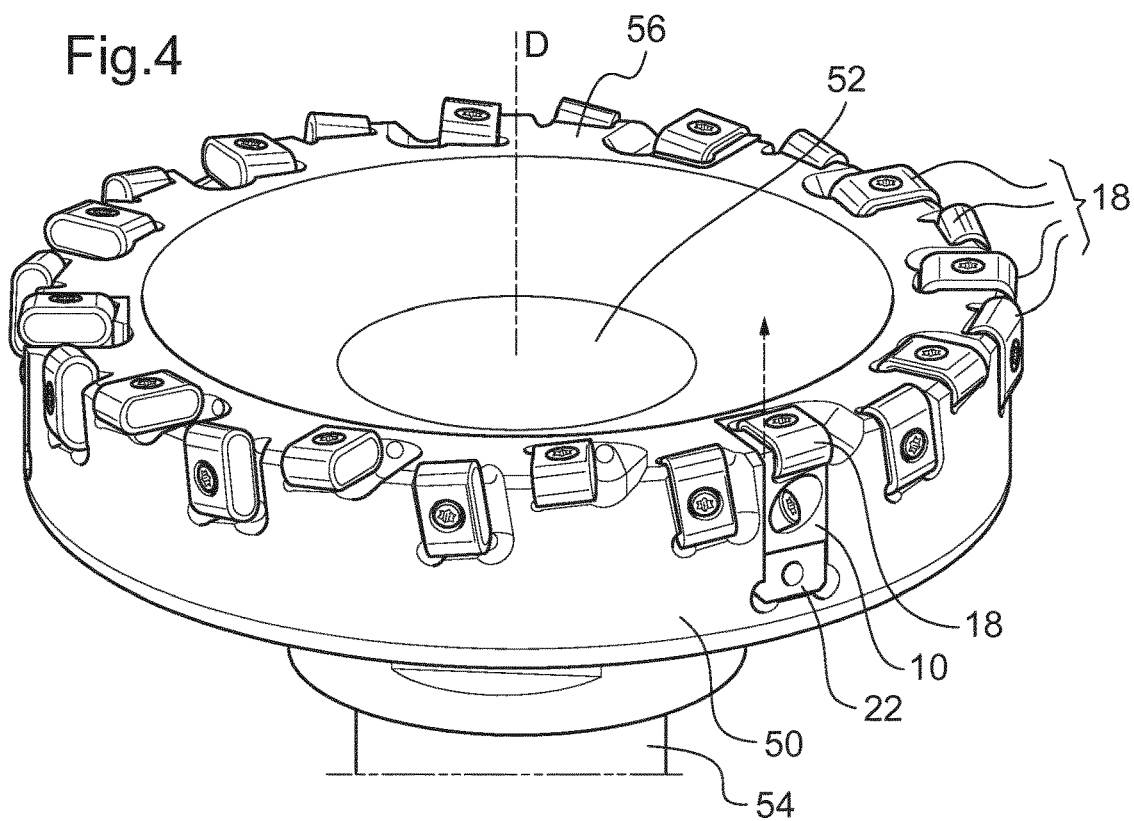
FIG. 4 shows schematically a milling tool comprising the assembly according to FIG. 1.

FIG. 4 shows the cutting insert positioning system installed within in a recess of a milling tool 50, the recess being formed at the periphery of the milling tool 50. The milling tool 50 comprises a central portion 52 and a securing portion 54 extending from the central portion 52. The securing portion 54 enables the milling tool 50 to be secured to a milling machine (not shown). The milling tool 50 is enabled to be rotated about a rotating axis D for machining operations. The milling tool 50 further comprises a peripheral portion 56 extending from the central portion 52 and around the rotating axis D. The machining tool 50 further comprises a plurality cutting inserts 18 mounted onto the peripheral portion 56. Particularly, the milling tool 50 comprises one or more cutting insert positioning system and a plurality of fixed cutting inserts 18 clamped directly onto the milling tool 50. In other words, the plurality of fixed cutting inserts 18 are each clamped by means of a cutting insert screw screwed in the peripheral portion 56 of the milling tool 50. The cutting inserts 18 are disposed at the peripheral portion 56 of the milling tool 50 so that the cutting insert axis of each cutting insert screw is successively perpendicular or parallel to the rotating axis D of the milling tool 50. This latter disposition enables the milling tool 50 to machine perpendicularly and parallel to the rotating axis D. In other words, the milling tool 50 is a face mill.

A method is also provided for positioning a cutting insert 18 onto the machining tool 12 (or the milling tool 50). The cutting insert is positioned by first disposing the wedge 22 within the recess 14 of the machining tool 12 so that the threaded hole formed within the machining tool 12 is aligned with the positioning hole 30 formed within the wedge 22. Then, the positioning screw 26 is screwed into the wedge 22 at a predetermined position so that the first 28 and the second 32 threaded portions cooperate respectively with the threaded hole of the machining tool 12 and the positioning hole 30 of the wedge 22. The cartridge 10 is then disposed within the recess 14 so that the wedge 22 contacts the end wall 23 of the cartridge 10 and the clamping screw 19 is screwed into the clamping hole 17 of the cartridge 10 at a predetermined torque, preferably between 3 and 5 N·m. Finally, the position of the cartridge 10 is adjusted by screwing the positioning screw 26 in opposite directions along its central longitudinal axis A until the cutting insert 18 has reached the predetermined position. In this way, when the cartridge 10 is displaced beyond the predetermined position along the central longitudinal axis A, the cartridge 10 can be displaced in the opposite direction so as to set the cartridge 10 at the predetermined position. Therefore, contrary to the known cartridge described above, the clamping screw 19 does not have to be unscrewed to displace the cartridge 10 in the opposite direction.

For facilitating the positioning operation, it is preferable that the predetermined position is defined by a number of revolutions made by the positioning screw 26.

Figure 5:
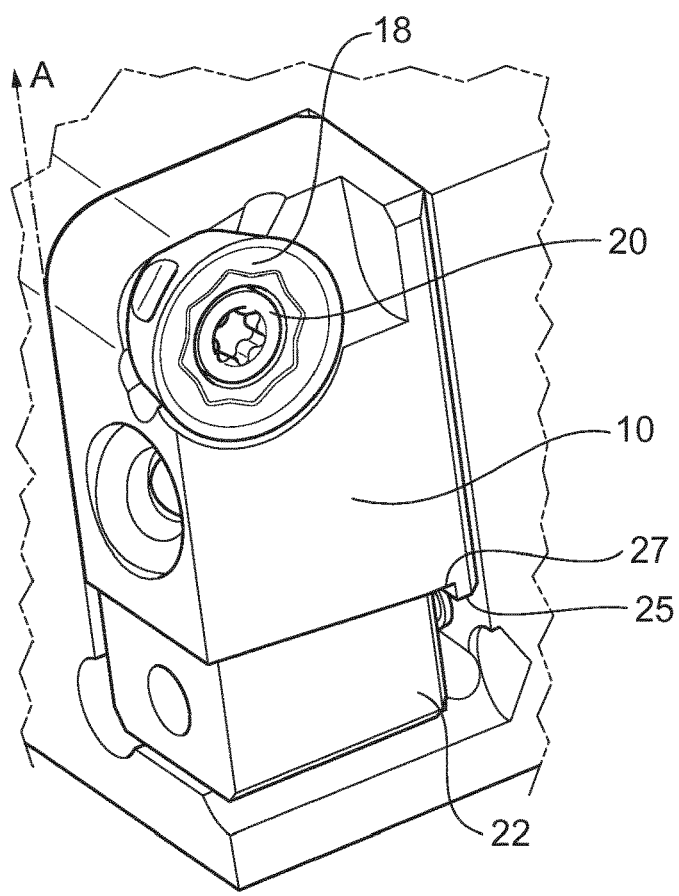
FIG. 5 shows schematically another embodiment of the assembly according to FIG. 1.

The invention has been described with reference to preferred embodiments. However, many variations are possible within the scope of the invention. For instance, FIG. 5 shows a cartridge 10 with a slot 16 arranged so that the extending axis of the cutting insert screw 20 extends substantially perpendicular to the central longitudinal axis A. Further, many shapes of cutting inserts 18 may be operated, for example a circular-shaped cutting insert as shown on FIG. 5.

Furthermore, alternatively to the layout shown on FIG. 4 on which the central longitudinal axis A is substantially parallel to the rotating axis D of the milling tool 50, the central longitudinal axis may be perpendicular to the rotating axis D or with another inclination.

The invention claimed is:
1. A machining tool comprising:
a recess formed at a periphery of the machining tool; and
a cutting insert positioning system disposed within the recess, the cutting insert positioning system including a cartridge arranged for positioning a cutting insert on the machining tool, the cutting insert being configured to be clamped onto the cartridge, the cartridge having a central longitudinal axis along which the cutting insert is configured to be positioned, wherein the cutting insert positioning system includes a wedge arranged to displace the cartridge along the central longitudinal axis, the cartridge including an end wall contacting the wedge and being arranged to support the cartridge, the end wall defining a first surface extending beyond the end wall and transversally to the central longitudinal axis, a rear wall arranged to support the cartridge against the machining tool and defining a second surface extending beyond the rear wall, and a front clamping wall having a clamping hole, said clamping hole extending along a clamping direction and being configured to receive a clamping screw for clamping the cartridge onto the machining tool along the clamping direction, wherein the clamping direction is arranged to intersect the first and second surfaces of the cartridge when tightening the cartridge to the tool, wherein a cutting insert hole extends along a cutting insert axis for clamping the cutting insert to the cartridge, the cutting insert axis being substantially parallel to the central longitudinal axis.

2. The machining tool according to claim 1, wherein the clamping direction is arranged to intersect the rear wall.

3. The machining tool according to claim 1, wherein the rear wall includes a first and a second rear wall arranged to support the cartridge against the machining tool, wherein the clamping direction intersects the first and/or second rear walls.

4. The machining tool according to claim 3, wherein the second surface includes a first and a second surface portion defined by the first and the second rear walls respectively, wherein the clamping direction intersects the first rear wall and the second surface portion.

5. The machining tool according to claim 1, wherein the end wall is oblique with respect to the central longitudinal axis.

6. The machining tool according to claim 1, further comprising an abutting portion protruding from the end wall at the front clamping wall and/or rear wall for forming at least one abutment between the front clamping wall and the rear wall.

7. The machining tool according to claim 1, further comprising a positioning screw having a first threaded portion arranged for cooperating with a positioning hole formed within the wedge, and a second threaded portion arranged for cooperating with a threaded hole of the machining tool, wherein the end wall is oblique with respect to the central longitudinal axis and a wall of the wedge supporting the cartridge is oblique in a complementary manner to the end wall.

8. The machining tool according to claim 1, further comprising at least one fixed cutting insert clamped onto the machining tool.

9. The machining tool according to claim 1, wherein the machining tool is a milling tool including a plurality of cutting inserts each clamped onto a cutting insert positioning system and a plurality of fixed cutting inserts clamped onto the milling tool.

10. A method for positioning a cutting insert onto a machining tool, comprising the steps of:

providing a cutting insert positioning system including a cartridge for positioning a cutting insert on the machining tool, the cutting insert being configured to be clamped onto the cartridge, the cartridge having a central longitudinal axis along which the cutting insert is configured to be positioned, wherein the cutting insert positioning system includes a wedge arranged to displace the cartridge along the central longitudinal axis, and including an end wall arranged to support the cartridge, the end wall defining a first surface extending beyond the end wall and transversally to the central longitudinal axis, a rear wall arranged to support the cartridge against the machining tool and defining a second surface extending beyond the rear wall, and a front clamping wall having a clamping hole, said clamping hole extending along a clamping direction and being configured to receive a clamping screw for clamping the cartridge onto the machining tool, wherein the clamping direction is arranged to intersect the first and second surfaces of the cartridge when tightening the cartridge to the tool, and wherein a cutting insert hole extends along a cutting insert axis for clamping the cutting insert to the cartridge, the cutting insert axis being substantially parallel to the central longitudinal axis, the wedge contacting the cartridge at the end wall, a clamping screw disposed within the clamping hole of the cartridge for clamping the cartridge to the machining tool, a positioning screw having a first threaded portion arranged for cooperating with a positioning hole formed within the wedge, and a second threaded portion arranged for cooperating with a threaded hole of the machining tool, wherein the end wall is oblique with respect to the central longitudinal axis and a wall of the wedge supporting the cartridge is oblique in a complementary manner to the end wall;

disposing the wedge within a recess of the machining tool so that the threaded hole formed within the machining tool is aligned with the positioning hole formed within the wedge;

screwing the positioning screw into the wedge so that the first and the second threaded portions cooperate respectively with the positioning hole of the wedge and the threaded hole of the machining tool;

disposing the cartridge within the recess so that the wedge contacts the end wall of the cartridge;

screwing the clamping screw into the clamping hole of the cartridge along the clamping direction at a predetermined torque; and adjusting the position of the cartridge by screwing the positioning screw in opposites directions along its central longitudinal axis so as to position the cutting insert at a predetermined position.

\* \* \* \* \*